(12) United States Patent
Prestenback et al.

(10) Patent No.: US 8,918,806 B2
(45) Date of Patent: Dec. 23, 2014

(54) PACKAGED MEDIA PLAYBACK WITH REMOTELY OBTAINED SUPPLEMENTAL CONTENT

(75) Inventors: Kyle J. Prestenback, Burbank, CA (US); Christopher R. Antimary, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 803 days.

(21) Appl. No.: 12/416,502

(22) Filed: Apr. 1, 2009

(65) Prior Publication Data

US 2010/0254674 A1 Oct. 7, 2010

(51) Int. Cl.
| | |
|---|---|
| H04N 7/10 | (2006.01) |
| H04N 7/025 | (2006.01) |
| H04N 7/173 | (2011.01) |
| H04N 9/87 | (2006.01) |
| H04N 21/2743 | (2011.01) |
| H04N 21/426 | (2011.01) |
| H04N 21/432 | (2011.01) |
| H04N 21/658 | (2011.01) |
| H04N 21/858 | (2011.01) |
| H04N 5/85 | (2006.01) |

(52) U.S. Cl.
CPC ......... H04N 7/17318 (2013.01); H04N 9/8715 (2013.01); H04N 21/2743 (2013.01); H04N 21/42646 (2013.01); H04N 21/4325 (2013.01); H04N 21/6581 (2013.01); H04N 21/8586 (2013.01); H04N 5/85 (2013.01)
USPC .................. 725/34; 725/32; 725/35; 725/36; 725/114; 725/116

(58) Field of Classification Search
None
See application file for complete search history.

(56) References Cited

U.S. PATENT DOCUMENTS

| | | | |
|---|---|---|---|
| 6,760,916 B2 * | 7/2004 | Holtz et al. ...................... | 725/34 |
| 6,965,730 B2 * | 11/2005 | Chamberlin et al. ......... | 386/293 |
| 2002/0094868 A1 * | 7/2002 | Tuck et al. ....................... | 463/42 |
| 2002/0178443 A1 * | 11/2002 | Ishii ................................. | 725/22 |
| 2006/0205516 A1 * | 9/2006 | Yeend et al. ..................... | 463/43 |
| 2007/0157252 A1 * | 7/2007 | Perez ............................... | 725/61 |
| 2008/0307454 A1 * | 12/2008 | Ahanger et al. ................ | 725/36 |
| 2010/0083307 A1 * | 4/2010 | Zalewski ......................... | 725/34 |
| 2010/0100557 A1 * | 4/2010 | Kitazato ........................ | 707/754 |
| 2010/0119206 A1 * | 5/2010 | Craner et al. ................... | 386/68 |
| 2010/0146542 A1 * | 6/2010 | Weihs et al. .................... | 725/34 |
| 2010/0153993 A1 * | 6/2010 | Konig et al. .................... | 725/34 |

* cited by examiner

*Primary Examiner* — Nasser Goodarzi
*Assistant Examiner* — Fred Peng
(74) *Attorney, Agent, or Firm* — Sheppard Mullin Richter & Hampton LLP (57) ABSTRACT

Fans or other persons can upload content that others can choose to view when they play back a film, television show or other packaged media content item. A server system receives a playback indication from a remote media player via a data network, and in response retrieves an uploaded supplemental content item. The playback indication can not only identify the film, television show or other packaged media content item, but can further identify a playback location in the identified content item, such as a specific scene. The server system can use such information to select and retrieve one of a number of uploaded supplemental content items. The server system transmits the supplemental content item to the media player, which then plays back the supplemental content item in association with the packaged media content item.

21 Claims, 4 Drawing Sheets

PACKAGED MEDIA PLAYBACK WITH REMOTELY OBTAINED SUPPLEMENTAL CONTENT

BACKGROUND

The playback of movies, music and other content recorded on optical disks or other packaged media has become commonplace. For example, it is common to insert a prerecorded optical disc into a computer disc drive and use a virtual, i.e., software-based, player to view the content on the computer screen. Integrated video disc players, i.e., machines that have integral screens, can be used similarly. However, the use of computers and computer-like devices to play back content is rooted in the use of standalone players, i.e., player machines that output signals to television screens. Indeed, standalone media players remain quite popular, and it is common for persons to rent or purchase discs to view movies, television shows, and other content through television screens and other home entertainment systems via a standalone player. Newer high-definition (HD) video formats and economical large-screen HD televisions have helped maintain the popularity of this mode of playback.

Videocassette recorders (VCRs) were for many years the dominant type of playback device for consumer use. A VCR is a machine to which a person can connect a television and play back a videocassette, in which the signals are recorded on magnetic tape. Movies, television shows, and other titles were widely available for rental or purchase on the videocassette medium.

Optical disc media have largely supplanted the videocassette. A common optical disc format is known as DVD. The recording medium (disc) itself is known simply as a DVD. A DVD player plays back a DVD in a manner analogous to that in which a VCR plays back a videocassette. However, the DVD format provides a number of improvements, including on-screen menus that a user can navigate using a remote control. When a person inserts a DVD into a DVD player, the player responds not only to recorded video signals but to recorded data files that include predefined commands for generating on-screen displays, such as menus and sub-screens. Upon inserting a DVD, the user is typically presented with an on-screen main menu listing one or more options, from which the user can select an option using the remote control. The menu options typically include setting up or customizing various playback features, playing back the movie or other main content item in its entirety, navigating to a selected scene or other sub-portion for playback, and navigating to "bonus material" such as movie trailers, commentary, deleted scenes, and behind-the-scenes information. The menu screen display may include not only the textual label of each menu option (e.g., "Play Movie") but also images, such as still images from the film or other content item. In some instances, the images move in a pattern or otherwise provide a pleasing effect for the user to view while deciding which menu option to select.

One common feature that can be accessed by selecting a menu option is known as "audio commentary." The audio commentary feature relates to playing a special or secondary audio track while the movie or other main content item is playing back, instead of the main content item's own audio track. Examples of audio commentary include a director, writer, cast member, cinematographer, editor, etc, talking about the making of the film, or a film historian or critic commenting on a film. An extension to the concept of audio commentary, a concept known as "video commentary," has also been explored. In video commentary, still or moving imagery is displayed in conjunction with the main content item, such as in a split-screen or sub-screen arrangement. For example, video commentary comprising behind-the-scenes video can be displayed alongside the main content item as the main content item is playing back, so that as each portion of a film is played back the user can also see behind-the-scenes video relevant to the making of that portion.

Another feature that has been included in some DVDs and that can be accessed by selecting a menu option is a "gallery" of still images. The still images can include, for example, images of characters that appear in the film or other content item, or images obtained from sources outside the production company, such as artwork accepted from fans of the film or its cast who submitted their artwork to the production company pursuant to a contest.

A newer generation of optical disc technology provides improved HD video formats and media storage capacity and encompasses so-called "smart" media players. One such technology is known as Blu-ray Disc®, a format administered by the Blu-ray Disc Association, a consortium of consumer electronics, computer, and media manufacturers. Media players that take advantage of advanced features of this newer generation of optical disc technology are referred to as smart media players because they can perform operations that are significantly more complex and computer-like than the simple menu navigation and other operations provided under the DVD standard. This next generation of standards contemplates that media players may include non-volatile data storage, such as solid-state (e.g., flash) memory and magnetic disk drives, as well as programmable processor systems that can execute versatile programming code (such as Java code) read from the disc. In addition, some media players include interfaces for connection to the Internet.

SUMMARY

Embodiments of the present invention relate to server systems, media players, packaged media products, and methods that relate to playback of a remotely obtained supplemental content item in association with playback of a packaged media content item on a "smart" media player such as a Blu-ray Disc® player.

In accordance with exemplary embodiments of the invention, a server system can receive a playback indication from a remote media player via a data network, and in response can retrieve a supplemental content item from a data storage system. The playback indication is associated with playback of a packaged media content item, such as a film, television show, or the like, recorded on a packaged medium (e.g., an optical disc). A media player can transmit a playback indication to the server system at any suitable time associated with the playback of a packaged media content item on the media player. A playback indication can be transmitted one or more times during, before, or otherwise in association with the playback.

The playback indication can include a content identifier associated with the packaged media content item. The content identifier can identify the packaged media content item, such as a particular film, television show, or the like, and can further identify a playback location in the identified content item, such as a specific scene in a film. The server system can use the content identifier to select and retrieve one of a number of supplemental content items stored in the data storage system.

The supplemental content items can be stored in the server system in any suitable manner. For example, fans of a particular film, television show, or the like can upload supplemental content items to the server system via a web site. A fan can thus create artwork or other supplemental content, identify a content item (e.g., a film) and a scene or other playback location in the identified content item, and upload that information via the web site.

The server system transmits the retrieved supplemental content item to the remote media player via the data network. Under control of software (code) that can be included on the packaged medium itself or provided in another suitable manner, the media player not only plays back the packaged media content item that is recorded on the disc or other packaged medium loaded in the media player, but also transmits the above-described playback indication to the server system via the network interface, receives the supplemental content item from the server system in response, and plays back the supplemental content item in association with playing back the packaged media content item.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
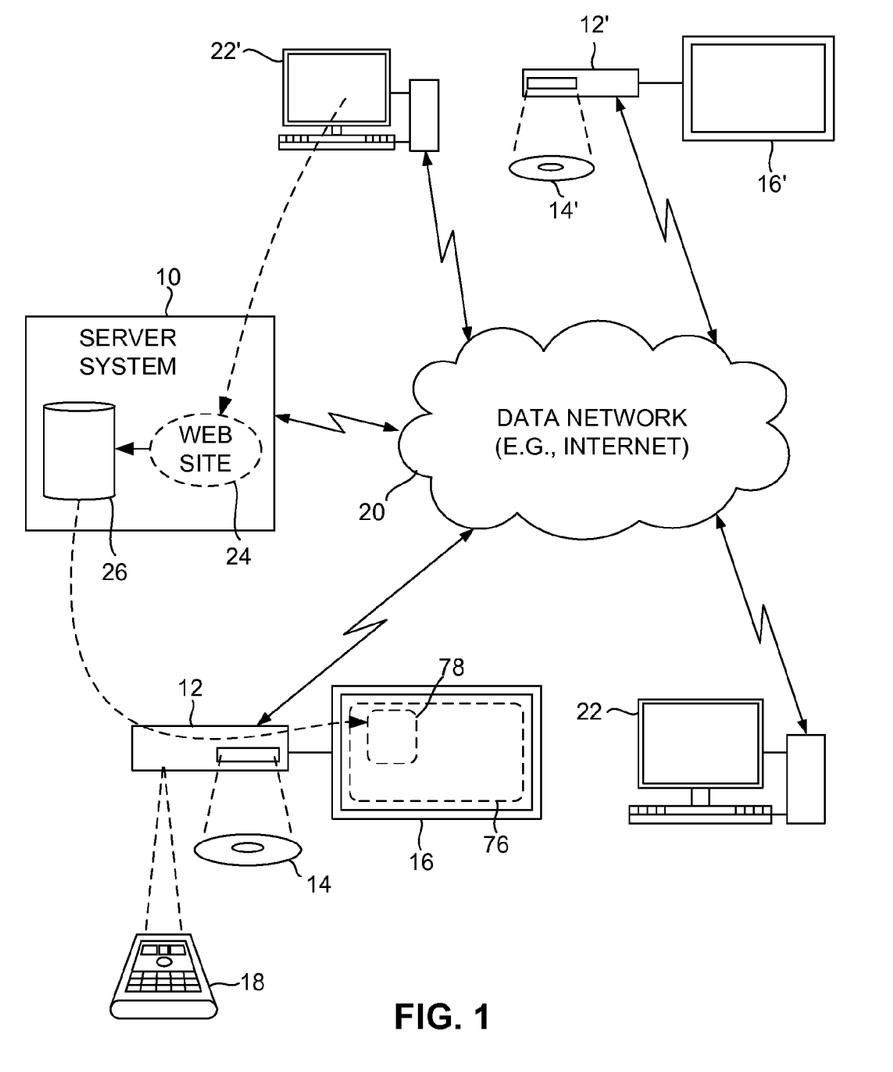
FIG. 1 illustrates a system in which one or more media players play remotely obtained supplemental content items in association with playing back content items recorded on packaged media loaded in the media players, in accordance with an exemplary embodiment of the invention.

As illustrated in FIG. 1, in an illustrative or exemplary embodiment of the invention, a server system 10 provides user-provided content items or other supplemental content items to a media player 12, to play back in association with playing back a packaged media content item recorded on an optical disc 14. Server system 10 and its operation are described in further detail below.

Media player 12 is of a type sometimes referred to as a "smart" media player, such as a Blu-ray Disc® player. Media player 12 can play an optical disc 14 on a television display (also referred to as a screen) 16 or similar device to which media player 12 can be connected. A user can interact with media player 12 using a handheld remote control 18 or by pressing buttons (not shown for purposes of clarity) on a control panel of media player 12. Examples of user input that can be provided via remote control 18 or control panel buttons include commands to play back a content item that is recorded on disc 14, fast-forward or fast-reverse to a desired playback location in the content item, navigate through on-screen menus and select menu options, eject disc 14 from media player 12, etc.

Although not described in further detail in this patent specification ("herein"), it should be understood that a user can use media player 12 in a conventional manner to play any suitable packaged media content item. The methods of operation and packaged media products described herein that relate to the present invention can supplement rather than replace those that are conventional. Thus, for example, in the conventional manner a user can insert a conventionally recorded disc (not shown) into media player 12, use remote control 18 to select a "Play" option (e.g., from an on-screen menu), and otherwise control media player 12 to view the recorded content item on television display 16. Although only the use of one such media player 12 is described herein for purposes of clarity, it is contemplated that there are other such media players 12' that can be operated by other users in a similar manner.

Although the exemplary media player 12 plays, i.e., accepts optical discs 14, in other embodiments a media player can accept any other suitable type of packaged medium. The term "packaged medium" is used herein to refer to a disc or other digital recording medium on which content has been pre-recorded by or at the direction of a party, other than the user, responsible for the production of the disc or its content. Although the term "packaged" medium as used in the art is intended to evoke the commercial manner in which such media are typically provided to consumers who purchase or rent them (i.e., in a box, case or similar commercial packaging), the term "packaged medium" is used herein to mean the recording medium only and does not encompass any packaging materials. The medium can be optical, magnetic, magneto-optical, solid state, or any other suitable type, and can have any suitable physical form, such as a disc, plug-in memory module, etc. In the exemplary embodiment, for example, the medium can be compatible with the Blu-ray Disc® standards. The related term "packaged media product" is used herein to refer to a set of one or more packaged media on which one or more content items as well as program code for instructing media player 12 are recorded. A content item, such as a film, television show, or the like, can also be referred to as a packaged media content item.

As further illustrated in FIG. 1, server system 10 and media players 12 are connected to a data network 20 such as the Internet or a portion thereof. In addition, users of computers 22, which are also connected to data network 20, can interact with a web site 24 provided or hosted by server system 10. A computer 22 can be any suitable type of computing device, such as a desktop computer, laptop computer, handheld computing device, etc., and can be connected to data network 20 via any suitable wired or wireless connections.

Server system 10 further includes data storage 26 that is used in the manner described below. Although not shown for purposes of clarity, server system 10 includes other conventional hardware, software or other elements of the types commonly included in systems that host interactive web sites. In the exemplary embodiment, server system 10 is programmed with suitable software (not separately shown for purposes of clarity) or otherwise configured to effect the method represented by the flow diagram of FIG. 2.

Figure 2:
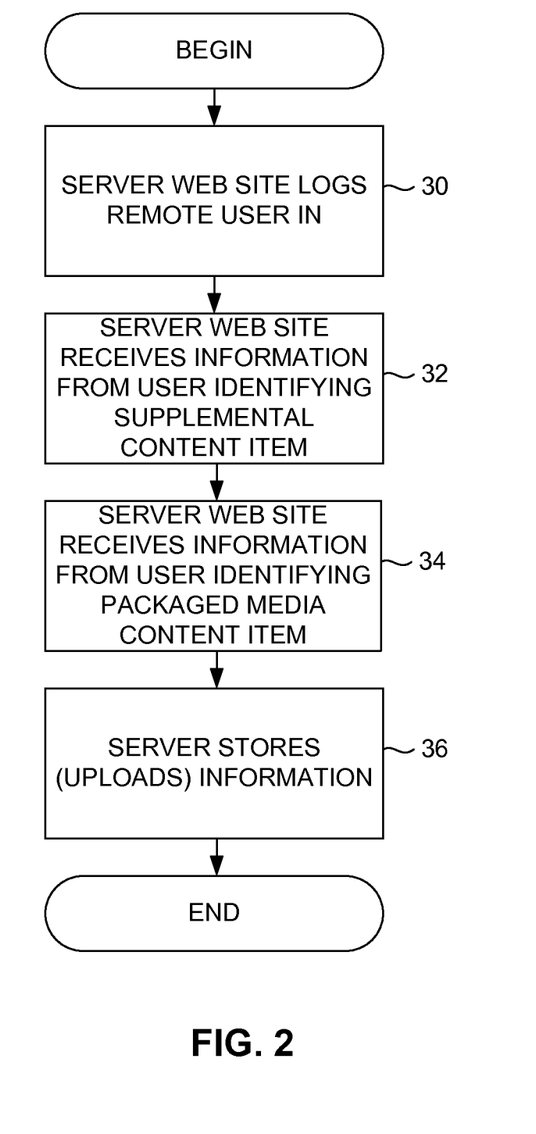
FIG. 2 is flow diagram, illustrating a method for uploading supplemental content items to the server system in FIG. 1.

As indicated by block 30 in FIG. 2, server system 10 receives login information from a user of computer 22, such as a user name and password corresponding to a previously established user account, and logs the user in to web site 24. Web site 24 provides a means for a user to upload content, referred to herein as supplemental content because it supplements the packaged media content in the manner described below. A supplemental content item can be any visual, audible or other item of content that the user wishes other users to view in association with one or more packaged media content items or portions thereof. For example, a fan of a particular film, television show, genre, character, actor, director, studio, etc., can upload artwork that the fan created. As indicated by block 32, server system 10 receives information the user via web site 24 that identifies a supplemental content item to be uploaded from the user's computer 22 to server system 10.

As indicated by block 34, server system 10 receives information from the user via web site 24 that identifies one or more packaged media content items or portions thereof with which the user-provided supplemental content item is to be associated. For example, a fan of a particular film can provide information that identifies that film or a group of films. The information can be provided in any suitable manner. For example, web site 24 can provide the user with a list of films or other packaged media content items from which the user can choose. Alternatively or in addition, the user can provide information such as descriptive keywords, an actor's name, etc., that indirectly identifies one or more packaged media content items or portions thereof. Server system 10 can then use such information to identify one or more packaged media content items or portions thereof (e.g., scenes or other playback locations). It is contemplated that server system 10 will be operated by or under the direction of the party, i.e., a business, that produces or is associated with the production of the packaged media content items or packaged media products, and that the party therefore has access to information relating to descriptive keywords, the names of actors, directors, etc., and related playback locations, that can facilitate server system 10 identifying one or more of those packaged media content items and relevant playback locations therein. However, server system 10 can be operated by any party.

As noted above, in the exemplary embodiment, the information received from the user can identify (directly or indirectly) not only a packaged media content item but also a portion thereof, such as a scene. Thus, for example, a user can associate the supplemental content item with a particular scene or other playback location in a film. As described in further detail below, when the packaged media content item playing in media player 12 reaches the specified scene or other playback location, media player 12 plays the supplemental content item along with or otherwise in association with the specified scene.

Figure 3:
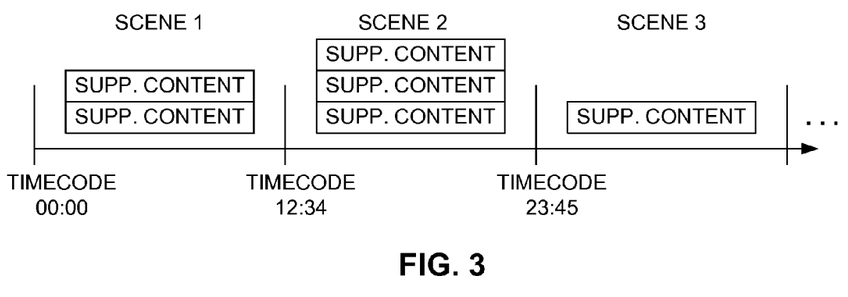
FIG. 3 illustrates uploaded supplemental content items in the server system in FIG. 1.

As indicated by block 36, once the user has provided information identifying a supplemental content item and packaged media content item, server 10 can upload the information. Server 10 stores the information in data storage 26 (FIG. 1). In some embodiments, a human moderator or, alternatively, an automated (machine-based) moderator can review the information and mark it as approved or delete it before the information is stored or before it is made available for further use, to ensure that content deemed inappropriate is not provided. It should be noted that any number of users can use their computers 22 to upload any number of supplemental content items in association with any number of packaged media items (and playback locations therein that may be specified). In an example conceptually illustrated in FIG. 3, two supplemental content items are uploaded and stored in association with a first scene ("Scene 1") of a packaged media content item; three supplemental content items are uploaded and stored in association with a second scene ("Scene 2") of a packaged media content item; one supplemental content item is uploaded and stored in association with a third scene ("Scene 3") of a packaged media content item, and so forth. For purposes of illustrating playback locations, playback is represented in FIG. 3 by a timeline comprising a number of scenes and timecode values. In the illustrated example, Scene 1 begins at timecode 00:00 and ends at timecode 12:34, Scene 2 begins at timecode 12:34 and ends at timecode 23:45, etc. Timecodes, scene numbers, indices, or any other suitable means can be used to identify playback locations in a packaged media content item. In the exemplary embodiment, the timecode, scene numbers or other such location identifying information correspond to information recorded on disc 14 along with the content. That is, there is typically timecode information or other indexing information recorded on disc 14 that allows media player 12 to find a specific playback location on disc 14.

Figure 4:
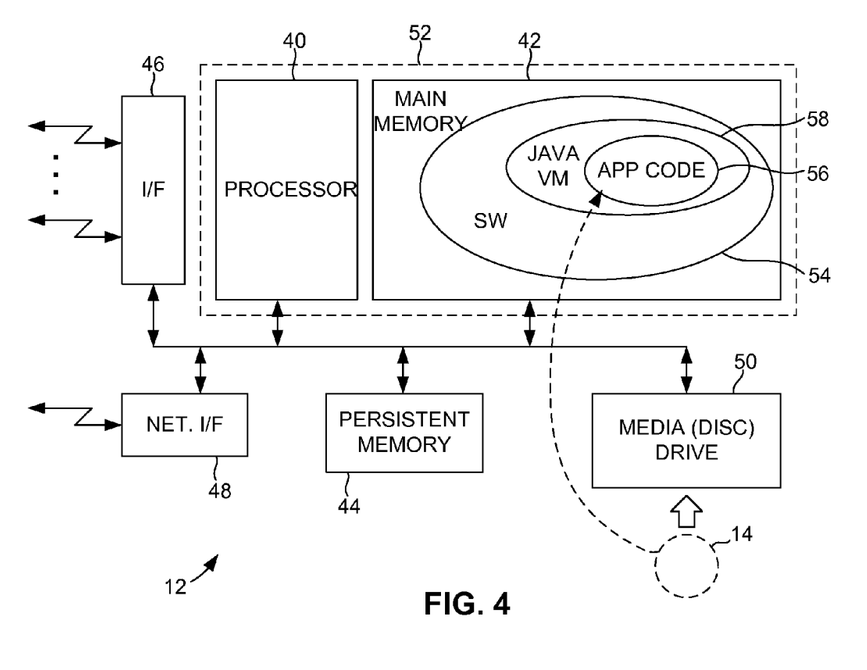
FIG. 4 is a block diagram, illustrating a media player in FIG. 1.

Media player 12 is of the type referred to as a "smart" media player, such as a Blue-ray Disc® player, and thus characteristically includes at least the following computer-like elements, which are interconnected via one or more data buses or other suitable means, as shown in FIG. 4: one or more processors 40, main or working memory 42, persistent memory 44, interfaces 46 for connecting television display 16 and other input and output devices, a network interface 48 for connecting media player 12 to data network 20 (FIG. 1) or other network, and a media receiver or drive 50. In the exemplary embodiment, media drive 50 is a disc drive that can read optical discs 14 that a user inserts into it. However, in other embodiments it can be any suitable type of device that can receive and read any suitable type of packaged media, such as those described above. It should be understood that the media player architecture or structure shown in FIG. 4 is intended merely to be representative of a typical smart media player and that such media players can have other suitable architectures and other suitable elements. For example, the buses and interfaces that interconnect certain elements can be structured to facilitate transfer of digital video signals. Furthermore, although an all-digital structure is shown for purposes of illustration, it should be understood that such media players can also include analog inputs and outputs.

In operation, code or other software elements are loaded into working memory 42 under control of processor 40 so that processor 40 can operate upon such code or other software elements in a programmed manner. Accordingly, as programmed with the software elements described below or other suitable software elements, the combination of processor 40 and working memory 42 (or other element or elements in which software elements are stored or reside) and any related elements defines a programmed processor system 52. Although not shown for purposes of clarity, programmed processor system 52 can include any other suitable hardware or software elements of the types commonly included in processor-based systems. Also, it should be noted that the combination of software elements and the medium on which they are stored or in which they reside (e.g., working memory 42 or persistent memory 44, disc 14, etc.) defines what can be referred to in the patent lexicon as a "computer program product" or "packaged media product."

As indicated in broken line in FIG. 4 and described in further detail below, when a user loads disc 14 into media drive 50, software elements 54 that are stored on disc 14, such as application code 56, are loaded into working memory 42. In the exemplary embodiment, application code 56 is in the Java language, and thus can be executed by a Java Virtual Machine (Java VM) 58, which is another software element. The manner in which a Java VM can execute Java code in a processor-based system is well understood in the art and therefore not described herein in further detail. Although in the exemplary embodiment the language of application code 56 is Java, it should be understood that in other embodiments application code 56 can be provided in any other suitable language or format and executed or otherwise acted upon in any other suitable manner.

Furthermore, although for purposes of illustration a software element, such as application code 56, may be shown and described herein as though it were a unitary element, persons skilled in the art recognize that such a software element can comprise any suitable number of portions or sub-elements, such as modules, code segments, objects, libraries, tables, instructions, etc., and that software elements may be loaded into working memory 42 in such portions on an as-needed basis, in accordance with conventional computing principles. It should also be noted that some or all of the above-described software elements, or additional software elements, can be loaded into working memory 42 from a suitable source other than disc 14, such as persistent memory 44 or a remote source (via network interface 48). Furthermore, although the exemplary embodiment includes persistent memory 44 and working memory 42, other embodiments can include any other suitable memory types and arrangements that can operate in any other suitable manner.

Figure 5:
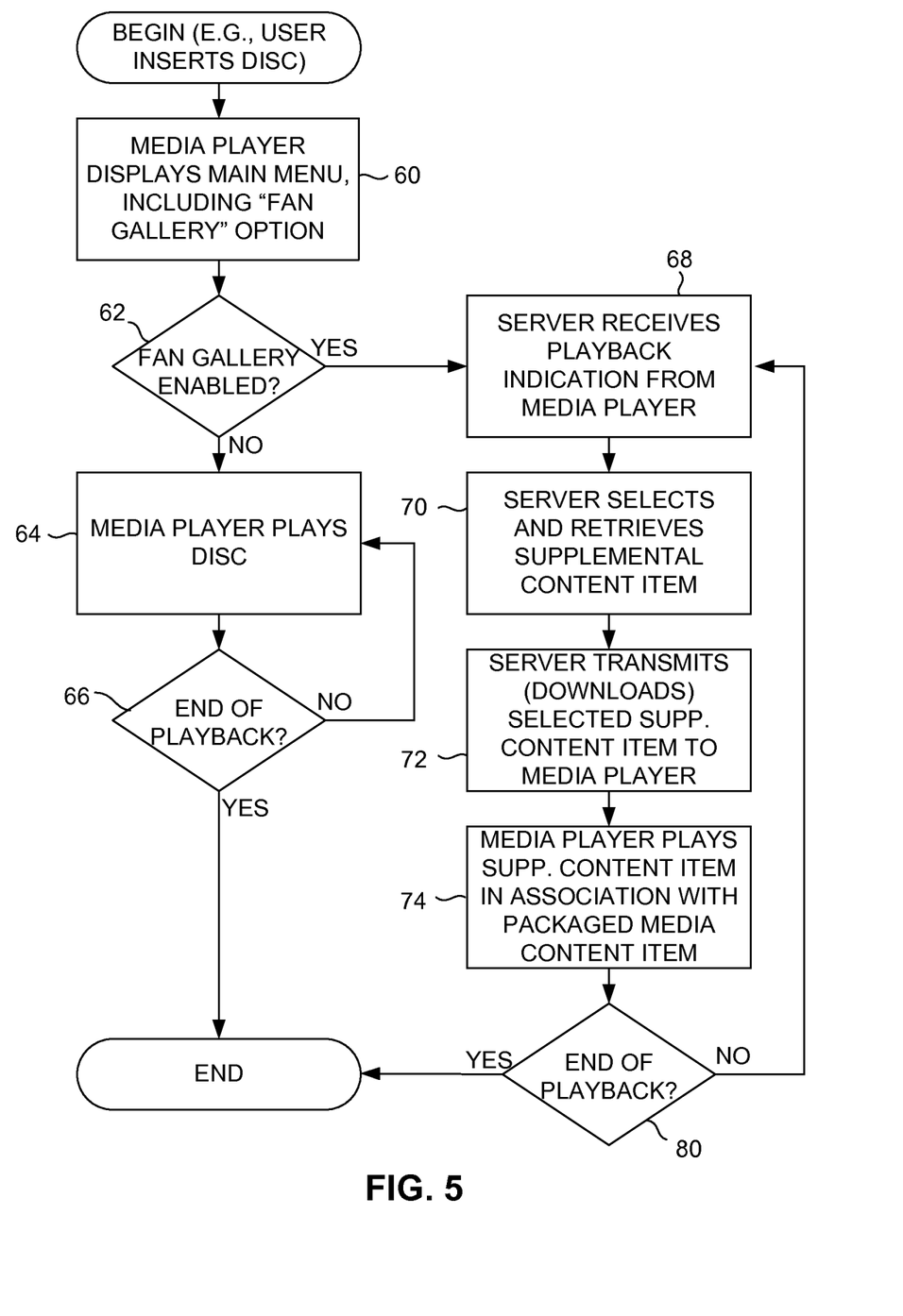
FIG. 5 is a flow diagram, illustrating a method for downloading a supplemental content item and playing it back on a media player in FIG. 1.

An exemplary method of operation of media player 12 is represented by the flow diagram of FIG. 5. The method is effected by the operation of media player 12, primarily under the control of application code 56. In view of the descriptions herein, persons skilled in the art will readily be capable of providing suitable application code 56 and otherwise programming or configuring media player 12 to effect the exemplary method.

As indicated by block 60 in FIG. 5, in response to a user loading disc 14 into media player 12, media player 12 displays a main menu. The main menu can include among the selectable menu options, an option that refers to the feature described herein whereby supplemental content is played back in association with packaged media content. The menu option can be called, for example, "Fan Gallery," in reference to supplemental content items provided by fans of a film, television show, actor, etc. As indicated by block 62, the user can select the Fan Gallery option to activate the feature described herein or, alternatively, elect to play back the packaged media content item recorded on disc 14 without the feature enabled, i.e., to play it back in the conventional manner. If the user elects to play back the packaged media content item in the conventional manner (e.g., by selecting a "Play Movie" option on the main menu), then media player begins playing back the packaged media content item until playback ends (e.g., when the item has finished playing, or when the user selects a "Stop" or "Pause" option), as indicated by blocks 64 and 66.

If the user elects to play back the packaged media content item with the Fan Gallery feature enabled, then media player 12 plays back one or more supplemental content items in association with playing back the packaged media content item. As indicated by block 68, at one or more suitable times before or during playback of the packaged media content item, media player 12 transmits a playback indication to server system 10 via data network 20 (FIG. 1). The playback indication can include additional information, such as a content identifier that identifies the packaged media content item. The content identifier can also include information identifying a playback location in the packaged media content item, such as information identifying a particular scene. Thus, for example, a playback indication can identify a particular scene in a particular film. Media player 12 can transmit in real-time a playback indication that includes a content identifier having information identifying a playback location, i.e., during playback, just before media player 12 reaches the point in the playback of the packaged media content item that corresponds to the playback location. For example, as playback approaches the location referred to as "Scene 2" of the packaged media content item, media player 12 can transmit a playback indication that includes a content identifier having information (e.g., a timecode, scene number, index, etc.) identifying the location referred to as "Scene 2." Thus, in the exemplary embodiment media player 12 in effect requests a supplemental content item, if one is available, in advance of reaching a playback location to which the supplemental content item may relate.

As indicated by step 70, server system 10 responds to the playback indication received from media player 12 by selecting and retrieving a supplemental content item from among those stored in data storage 26 (FIG. 1). Server system 10 can employ a suitable algorithm to select a supplement content item. The algorithm can use the content identifier as input. For example, server system 10 can look up in a table (not shown) a list of all supplemental content items associated with the packaged media content item identified by the content identifier and select one of them. The algorithm can include some amount of randomness. For example, the algorithm can include a random selection component, such that server system 10 selects a supplemental content item at random, or at least somewhat at random, from among supplemental content items listed as associated with the packaged media content item being played back.

As indicated by step 72, server system 10 further responds to the received playback indication by transmitting, i.e., downloading, the selected and retrieved supplemental content item to media player 12 via data network 20 (FIG. 1). A supplemental content item can be transmitted in any suitable format and manner. For example, it can be transmitted in portions or segments. If no supplemental content item associated with the packaged media content item is stored in data storage 26 or otherwise obtainable, server system 10 does not transmit a supplemental content item. Server system 10 can store any received supplemental content items in working memory 42 or persistent memory 44.

Once media player 12 has received a supplemental content item, media player 12 plays back the supplemental content item in association with the packaged media content item, as indicated by step 74. For example, with further reference to FIG. 1, media player 12 can cause the supplemental content item and packaged media content item to be displayed in a split-screen or dual-screen format, where the packaged media content item appears in a main screen or window 76, and the supplemental content item appears in a secondary screen or window 78. Alternatively, for example, media player 12 can play back portions of the packaged media content item and supplemental content item in an interwoven or alternating manner (not shown). Still other ways in which a supplemental content item can be played back in association with the packaged media content item will occur readily to persons skilled in the art in view of the examples and other teachings herein. Also, in embodiments in which a supplemental content item is received by media player 12 in portions or segments, media player 12 can play back each portion as it is received, in a manner similar to that which is commonly referred to as streaming video.

The above-described feature by which one or more supplemental content items are selected, retrieved, and played back in association with the packaged media content item can continue until playback ends, as indicated by step 80 (e.g., media player 12 reaches the end of the packaged media content item, or the user elects to end playback, etc.). Note that the steps or acts indicated by the above-described blocks can occur in any suitable order in addition to the exemplary order described above. Similarly, each step or act can occur any suitable number of times. Although in the exemplary embodiment media player 12 transmits a playback indication having a content identifier with information identifying a playback location each time the playback approaches a scene with which a supplemental content item may be associated, in other embodiments media player 12 can transmit a playback indication at an earlier time, at a later time, more frequently, or less frequently. In addition, in such other embodiments, server system 10 can respond by transmitting, i.e., downloading, more than one supplemental content item. For example, in response to receiving a playback indication, server system 10 can download multiple supplemental content items, before playback, during playback, or at any other suitable times, and media player 12 can then select one or more of the downloaded supplemental content items to play back in association with the packaged media content item.

In the manner described above, fans or other persons can provide content that others can choose to view when they play back a film, television show or other packaged media content item on a packaged media player.

While one or more embodiments of the invention have been described as illustrative of or examples of the invention, it will be apparent to those of ordinary skill in the art that other embodiments and implementations are possible that are within the scope of the invention. Accordingly, the scope of the invention is not to be limited by such embodiments but rather is determined by the appended claims.

What is claimed is:

1. A method for including supplemental content in packaged media playback, comprising:
    receiving a playback indication from a remote media player via a data network, the playback indication associated with playback of a packaged media content item recorded on a non-user packaged medium, the playback indication including a packaged media content item identifier identifying the content item recorded on the non-user packaged medium;
    retrieving a user-provided non-advertisement supplemental content item from a data storage system in response to the received playback indication by matching the packaged media content item identifier with a user-provided supplemental content item identifier, each user-provided non-advertisement supplemental content item in the data storage system having a user-provided supplemental content item identifier associating the user-provided non-advertisement supplemental content item with a user-selected one of a plurality of packaged media content items; and
    transmitting the retrieved user-provided non-advertisement supplemental content item to the remote media player via the data network for playback on the remote media player simultaneously in association with playback of the packaged media content item in a display area.

2. The method claimed in claim 1, further comprising:
    receiving a plurality of user-provided non-advertisement supplemental content items and corresponding user-provided supplemental content item identifiers from a plurality of user-operated remote devices;
    storing the plurality of received user-provided non-advertisement supplemental content items in the data storage system; and
    wherein retrieving the user-provided non-advertisement supplemental content item from the data storage system comprises:
        selecting one of the plurality of user-provided non-advertisement supplemental content items stored in the data storage system at least partly in response to matching the packaged media content item identifier from the received playback indication with a supplemental content item identifier from the data storage system; and
        retrieving the selected one of the user-provided non-advertisement supplemental content items.

3. The method claimed in claim 2, wherein selecting one of a plurality of user-provided non-advertisement supplemental content items comprises selecting one of a plurality of user-provided non-advertisement supplemental content items at least partly in response to an algorithm having a random selection component.

4. The method claimed in claim 1, wherein the packaged media content item identifier identifies a packaged media content item and a playback sequence location in the packaged media content item.

5. The method claimed in claim 4, wherein receiving a playback indication from a remote media player comprises receiving a playback indication from a remote media player in real-time while the remote media player is playing back the packaged media content item.

6. A server system for including supplemental content in packaged media playback, comprising:
    a data storage subsystem, the data storage subsystem storing user-provided non-advertisement supplemental content items;
    a network interface; and
    a processing system, the processing system programmed or configured to effect:
        receiving a playback indication from a remote media player via a data network, the playback indication associated with playback of a packaged media content item recorded on a non-user packaged medium, the playback indication including a packaged media content item identifier identifying the content item recorded on the non-user packaged medium;
        retrieving a user-provided non-advertisement supplemental content item from a data storage system in response to the received playback indication by matching the packaged media content item identifier with a user-provided supplemental content item identifier, each user-provided non-advertisement supplemental content item in the data storage system having a user-provided supplemental content item identifier associating the user-provided non-advertisement supplemental content item with a user-selected one of a plurality of packaged media content items; and
        transmitting the retrieved user-provided non-advertisement supplemental content item to the remote media player via the data network, wherein the supplemental content item is played in a display area simultaneously in association with playing back of the packaged media content item.

7. A media player having a feature for including supplemental content in packaged media playback, comprising:
    a media receptacle for receiving a non-user packaged medium;
    a network interface; and
    a processing system comprising a processor and memory, the processing system programmed or configured to effect:

playing back a packaged media content item recorded on the non-user packaged medium;

transmitting a playback indication to a remote system via the network interface to request supplemental content, the playback indication associated with playing back the packaged media content item, the playback indication including a packaged media content item identifier identifying the content item recorded on the non-user packaged medium;

receiving a user-provided non-advertisement supplemental content item from the remote system via the network interface in response to the transmitted playback indication, the user-provided non-advertisement supplemental content item having a user-provided association with the packaged media content item indicated by a user-provided supplemental content item identifier; and playing back the user-provided non-advertisement supplemental content item simultaneously in association with playing back the packaged media content item in a display area.

8. The media player claimed in claim 7, wherein the processor system is programmed or configured in response to programming code read from the non-user packaged medium.

9. The media player claimed in claim 7, wherein playing back the user-provided non-advertisement supplemental content item simultaneously in association with playing back the packaged media content item comprises playing back the user-provided non-advertisement supplemental content item to display in a secondary screen while playing back the packaged media content item to display in a primary screen.

10. The media player claimed in claim 7, wherein:
the packaged media content item identifier identifies a packaged media content item and a playback sequence location in the packaged media content item; and
transmitting the playback indication comprises transmitting the playback indication in real-time while playing back the packaged media content item.

11. The media player claimed in claim 7, wherein:
the packaged media content item identifier identifies a packaged media content item and a playback sequence location in the packaged media content item; and
playing back the user-provided non-advertisement supplemental content item simultaneously in association with playing back the packaged media content item in a display area comprises playing back the user-provided non-advertisement supplemental content item while playing back the packaged media content item and at a time substantially corresponding to the playback sequence location relative to a beginning of playback.

12. The media player claimed in claim 11, wherein playing back the user-provided non-advertisement supplemental content item while playing back the packaged media content item and at a time substantially corresponding to the playback sequence location relative to a beginning of playback comprises playing back the user-provided non-advertisement supplemental content item to display in a secondary screen while playing back the packaged media content item to display in a primary screen.

13. The media player claimed in claim 11, wherein the playback sequence location corresponds to information identifying a scene in the packaged media content item.

14. The media player claimed in claim 11, wherein the playback sequence location corresponds to information identifying a timecode in the packaged media content item.

15. A packaged media product for playback on a media player, the packaged media product comprising a machine-readable non-user packaged medium on which is recorded in machine-readable form a packaged media content item and code for instructing the media player to effect:
playing back the packaged media content item recorded on the non-user packaged medium;
transmitting a playback indication to a remote server system via the network interface, the playback indication associated with playing back the packaged media content item, the playback indication including a packaged media content item identifier identifying the content item recorded on the non-user packaged medium;
receiving a user-provided non-advertisement supplemental content item from the remote server system via the network interface in response to the transmitted playback indication, the supplemental content item having a user-provided association with the packaged media content item indicated by a user-provided supplemental content item identifier; and
playing back the user-provided non-advertisement supplemental content item simultaneously in association with playing back the packaged media content item in a display area.

16. The packaged media product claimed in claim 15, wherein the code for instructing the media player to effect playing back the user-provided non-advertisement supplemental content item simultaneously in association with playing back the packaged media content item comprises code for instructing the media player to effect playing back the user-provided non-advertisement supplemental content item to display in a secondary screen while playing back the packaged media content item to display in a primary screen.

17. The packaged media product claimed in claim 15, wherein:
the packaged media content item identifier identifies a packaged media content item and a playback sequence location in the packaged media content item; and
the code for instructing the media player to effect transmitting the playback indication comprises code for instructing the media player to effect transmitting the playback indication in real-time while playing back the packaged media content item.

18. The packaged media product claimed in claim 15, wherein:
the packaged media content item identifier identifies a packaged media content item and a playback sequence location in the packaged media content item; and
the code for instructing the media player to effect playing back the user-provided non-advertisement supplemental content item simultaneously in association with playing back the packaged media content item comprises code for instructing the media player to effect playing back the user-provided non-advertisement supplemental content item while playing back the packaged media content item and at a time substantially corresponding to the playback sequence location relative to a beginning of playback.

19. The packaged media product claimed in claim 18, wherein the code for instructing the media player to effect playing back the user-provided non-advertisement supplemental content item while playing back the packaged media content item and at a time substantially corresponding to the playback sequence location relative to a beginning of playback comprises code for instructing the media player to effect playing back the user-provided non-advertisement supplemental content item to display in a secondary screen while playing back the packaged media content item to display in a primary screen.

20. The packaged media product claimed in claim 18, wherein the playback sequence location corresponds to information identifying a scene in the packaged media content item.

21. The packaged media product claimed in claim 18, wherein the playback sequence location corresponds to information identifying a timecode in the packaged media content item.

* * * * *